United States Patent [19]

Thayer

[11] Patent Number: 5,098,022

[45] Date of Patent: Mar. 24, 1992

[54] FLOW DIVERTING NOZZLE FOR A GAS TURBINE ENGINE

[75] Inventor: Edward B. Thayer, Palm Beach Gardens

[73] Assignee: United Technologies Corporation, Hartford, Conn.

[21] Appl. No.: 637,725

[22] Filed: Jan. 7, 1991

[51] Int. Cl.$^5$ .................... F02K 1/42; B64C 15/00
[52] U.S. Cl. ................... 239/265.25; 239/265.33; 60/229
[58] Field of Search .......... 239/265.19, 265.25, 239/265.27, 265.29, 265.31, 265.33; 244/12.2, 12.5, 23 D, 52, 110 B; 60/229, 230

[56] References Cited

U.S. PATENT DOCUMENTS

| | | | |
|---|---|---|---|
| 3,248,878 | 5/1966 | Clark et al. | 60/230 |
| 3,266,243 | 8/1966 | Thomas | 60/229 |
| 3,611,725 | 10/1971 | Short | 60/229 |
| 4,205,813 | 6/1980 | Evans et al. | 60/229 |
| 4,241,876 | 12/1980 | Pedersen | 239/265.27 |

*Primary Examiner*—David M. Mitchell
*Assistant Examiner*—Karen B. Merritt
*Attorney, Agent, or Firm*—Christopher T. Hayes

[57] ABSTRACT

Disclosed is a gas turbine engine which incorporates a vertical thrust nozzle which diverts working fluid from the engine to selectively provide vertical thrust or a combination of vertical and forward thrust.

6 Claims, 3 Drawing Sheets

FLOW DIVERTING NOZZLE FOR A GAS TURBINE ENGINE

DESCRIPTION

1. Technical Field

This invention relates to gas turbine engines for aircraft, and particularly to such engines incorporating auxiliary nozzles to provide vertical thrust.

2. Background Art

One of the goals of manufacturers of gas turbine engines for aircraft has been to provide such aircraft with a vertical thrust capability so as to provide for take-off and landing on a minimum of runway length. In addition to standard forward and reverse thrust, a viable engine design must produce vertical thrust for the actual take-off and landing, and a combination of vertical and horizontal thrust to allow the aircraft to transition between forward flight and vertical take-off and landing. Although engine manufacturers have proposed various designs to provide vertical thrust, the complexity and penalties in weight and performance associated with such designs have heretofore been obstacles to incorporation of vertical thrust into high performance aircraft.

What is needed is a simple engine design that provides vertical thrust without incurring significant penalties in engine weight or performance.

DISCLOSURE OF INVENTION

It is therefore an object of the present invention to provide a gas turbine engine with a simple vertical thrust nozzle capable of selectively providing substantially vertical thrust, a combination of vertical and horizontal thrust, or no vertical thrust.

According to the present invention a flow diverting nozzle is disclosed which selectively provides vertical or a combination of vertical and forward thrust. The present invention diverts working fluid flowing axially through a gas turbine engine radially outward to produce a fluid jet having a substantial radial component relative to the engine and a selectively variable axial component. The flow diverting nozzle includes a tubular sleeve radially outward of the gas turbine engine duct through which the engine working fluid flows. The sleeve is axially positionable along the duct, and in conjunction with a port in the duct provides a valve which selectively varies the flow of working fluid from the duct through the port. A nozzle passage radially outward of the port communicates therewith, the passage having a forward surface which tends to deflect the working fluid flowing radially outward therealong aftward, and an aftward surface which tends to deflect the working fluid flowing radially outward therealong forward.

A flow directing flange at the end of the sleeve adjacent the port includes a flow directing surface which extends into the passage. The sleeve is selectively positionable between a closed position, in which the sleeve contacts the forward surface, and first and second open positions. In the first open position, the flow directing surface and the forward surface interact producing a jet of working fluid with substantial radial and axial thrust components relative to the engine. In the second open position, the flow directing surface is substantially removed from the nozzle passage such that the forward and aftward surfaces interact producing a jet of working fluid with substantially no axial component, thereby providing substantially vertical thrust. Outer doors at the exit of the passage selectively vary the lateral boundaries of the jet of working fluid to provide the desired exhaust area.

The present invention provides for a smooth transition between normal forward flight and the vertical thrust mode. Additionally, the vertical thrust nozzle of the present invention achieves such transition with significantly less complexity and weight than the vertical thrust nozzles of the prior art. Thus, the present invention represents a significant improvement over prior art.

The foregoing and other features and advantages of the present invention will become more apparent from the following description and accompanying drawings.

BEST MODE FOR CARRYING OUT THE INVENTION

Figure 1:
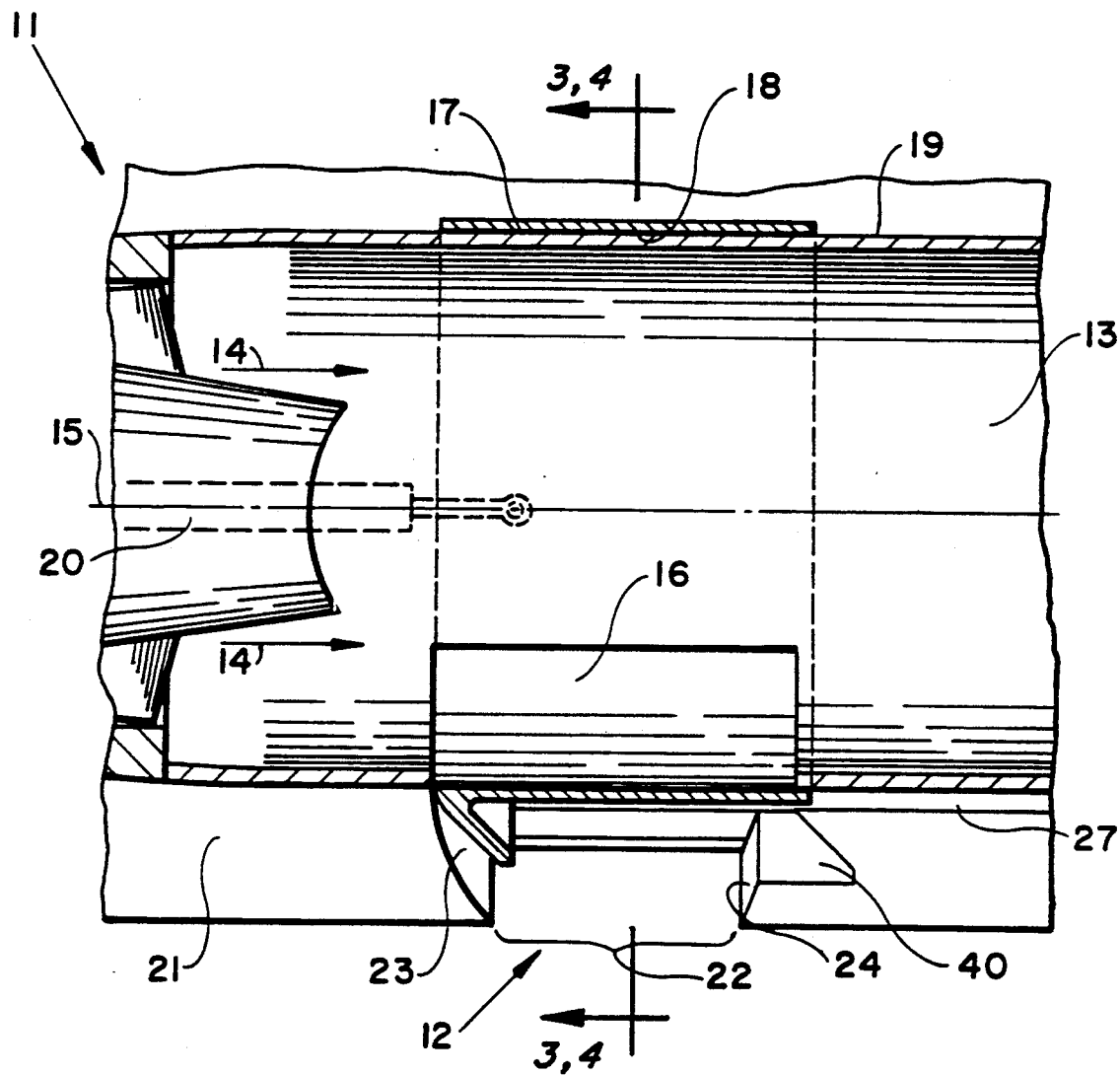
FIG. 1 shows a cross-sectional view of a portion of a gas turbine engine incorporating the flow diverting nozzle of the present invention.
Figure 2:
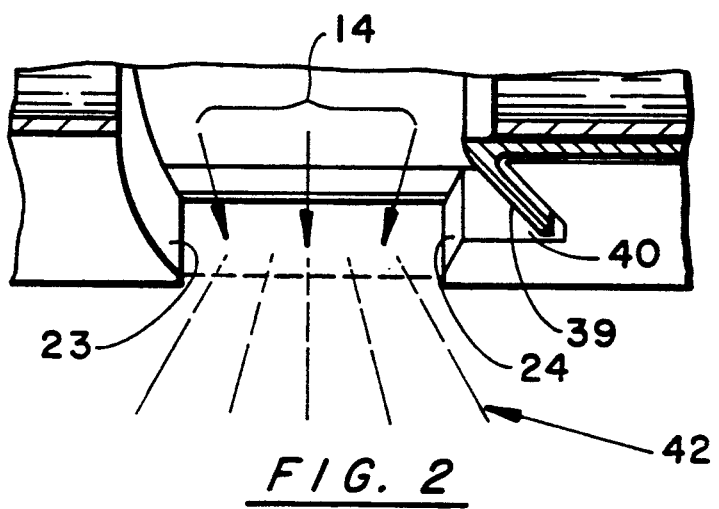
FIG. 2 shows a cross-sectional view of the flow diverting nozzle of FIG. 1 in the vertical thrust position.

FIG. 1 shows a portion 11 of a gas turbine engine with a flow diverting nozzle 12 of the present invention incorporated into the upstream end of the afterburner duct 13 through which working fluid 14 normally flows along the longitudinal axis 15 of the engine. The duct 13 is preferably tubular and includes a port 16 which extends through a portion of the duct 13. Radially outward of the duct 13 is a sleeve 17 having an inner surface 18 which slides axially along the outer surface 19 of the duct 13. The sleeve 17 and the port 16 cooperate to form a valve through which working fluid 14 from the duct 13 can selectively flow. The sleeve 17 is preferably tubular and is selectively positionable by one or more sleeve actuators 20 between a first position in which the sleeve 17 prevents the working fluid 14 from flowing out of the duct 13 through the port 16 as shown in FIG. 1, and a second position which provides a maximum flow area for working fluid 14 flowing through the port 16 as shown in FIG. 2.

Figure 3:
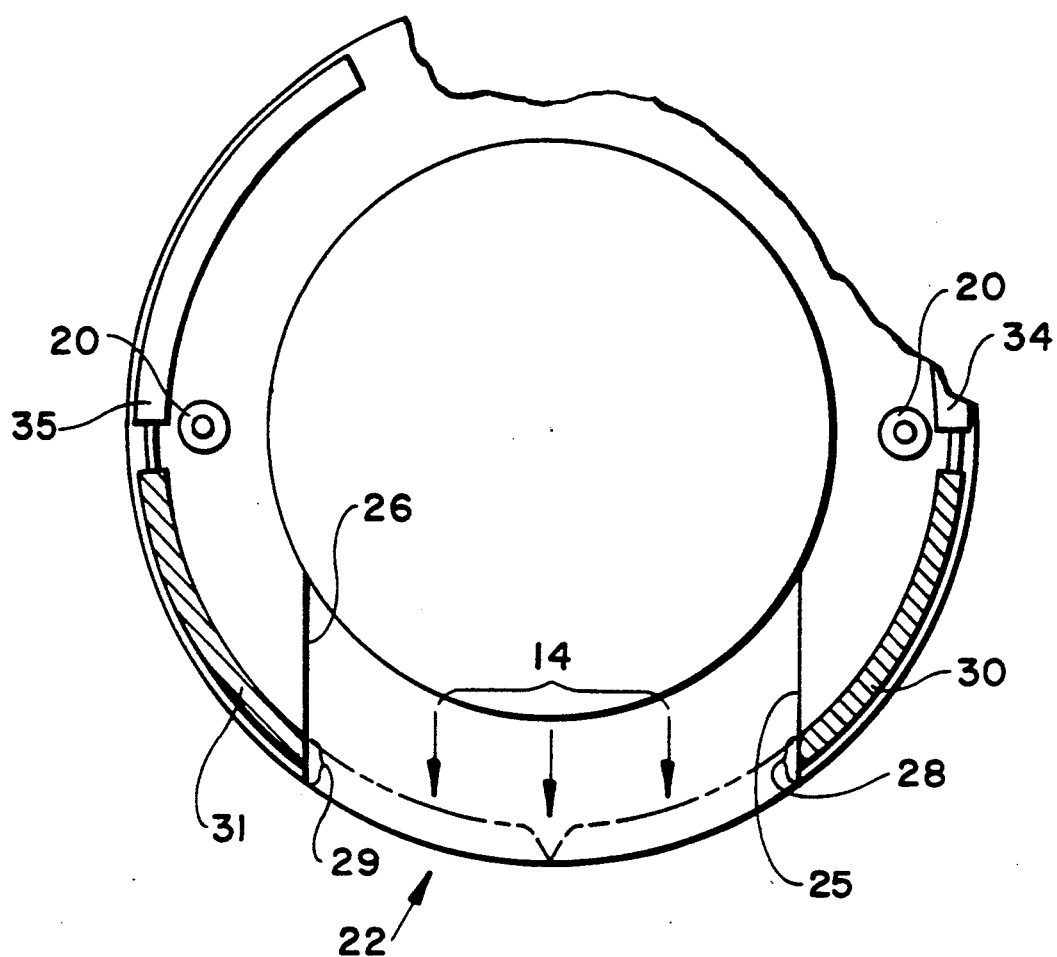
FIG. 3 shows a transverse section of the flow diverting nozzle taken along line 3—3 of FIG. 1.
Figure 4:
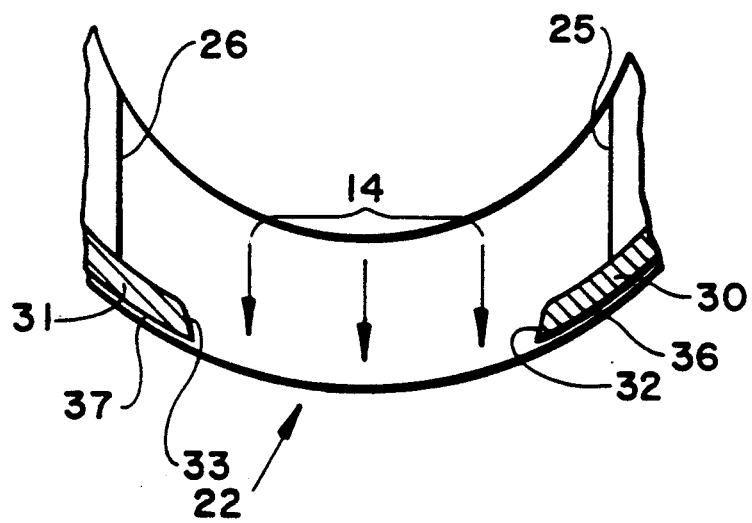
FIG. 4 shows a transverse section of the flow diverting nozzle taken along line 4—4 of FIG. 1 with the outer doors in a partially closed position.

Radially outward of the port 16 is an outer member 21, such as an afterburner case, including a nozzle passage 22 which leads from the port 16 to ambient atmosphere exterior of the engine. As shown in FIG. 1, the afterburner case 21 includes a forward surface 23 and an aftward surface 24, and as shown in FIGS. 3 and 4, two lateral, substantially planar walls 25, 26. The forward surface 23 is sloped radially aftward and the aftward surface 24 is sloped radially forward. As used herein, the term "radially aftward" describes a surface which, from a given point on the surface, any point which is aftward of the given point is also radially outward thereof. Likewise, the term "radially forward" describes a surface which, from a given point on the surface, any point which is forward of the given point is also radially outward thereof.

Figure 5:
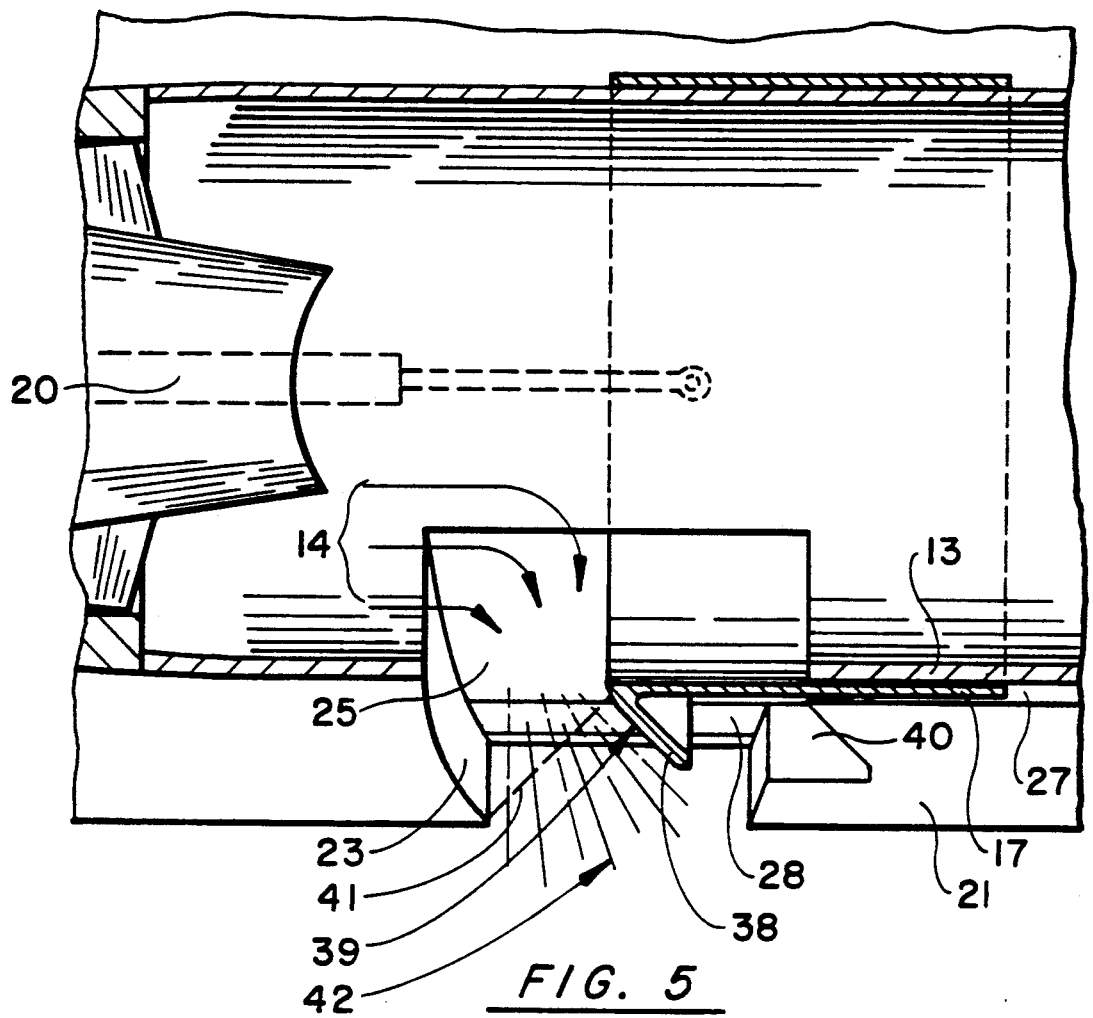
FIG. 5 shows a cross-sectional view of the flow diverting nozzle of FIG. 1 is positioned to provide a combination of vertical and horizontal thrust.

The afterburner case 21 includes a sleeve annulus 27 adjacent the duct 13 in which the sleeve 17 is located as shown in FIGS. 1 and 5. Radially outward of each of the lateral walls is a door slot 28, 29 through which an outer door 30, 31 may be extended or retracted as shown in FIGS. 3 and 4. The outer doors 30, 31 are slidably mounted within the afterburner case 21 and sealably span between the forward surface 23 and the aftward surface 24. The leading edge 32, 33 of each door 30, 31 is contoured to provide a smooth flow path for working fluid 14 flowing from the passage 22. Attached to the doors 30, 31 are door actuators 34, 35 which extend and retract the doors 30, 31. The doors 30, 31 are selectively positionable between an open position as shown in FIG. 3, in which the doors are fully retracted into the door slots 28, 29, and a closed position in which the leading edges 32, 33 of the doors 30, 31 sealingly contact (not shown), thereby preventing the flow of working fluid 14 through the passage 22 and providing an aerodynamic surface for ambient air flowing along the exterior 36, 37 of the doors 30, 31.

At one end of the sleeve 17 is a flow directing flange 38 which extends into the nozzle passage 22 as shown in FIG. 5. The flange 38 has a flow directing surface 39 sloped radially aftward opposite the forward surface 23 of the afterburner case 21. By sliding the sleeve 17 aftward, the flange 38 is retractable into a flange channel 40, thereby substantially removing the flow directing flange 38 from the passage 22.

During normal flight operation of the engine, the sleeve 17 is fully extended forward in sealing contact with the first surface 23 as shown in FIG. 1, and the outer doors are closed (as shown by the phantom lines in FIG. 3). To transition to vertical thrust, the outer doors 30, 31 are fully opened and the sleeve 17 is retracted aftward providing a throat plane 41 of approximately 45°, as shown in FIG. 5. The jet 42 of working fluid produced by this configuration has both radial and axial components, as those skilled in the art will readily appreciate, providing a combination of vertical and forward thrust.

To obtain substantially vertical thrust, the outer doors 30, 31 partially close to maintain the throat area established at the 45° throat plane 41, and the sleeve 17 is retracted further aftward. As the flange 38 enters the channel 40, the flow directing surface 39 is effectively removed from the flow path of the working fluid 14 flowing through the passage 22, and the aftward surface 24 is exposed thereto. The effect of the aftward surface 24 on the working fluid 14 flowing therealong counteracts the effect of the forward surface 23 on the working fluid 14, producing a jet 42 of working fluid 14 with essentially no net axial component, thereby providing substantially vertical thrust.

To transition from vertical thrust to forward flight, the sleeve 17 is extended until the 45° throat plane 41 is re-established, and then the doors 30, 31 are fully opened. Once the forward velocity of the aircraft has reached a desired speed, the sleeve 17 is extended to the fully forward position thereby preventing working fluid 14 from flowing through the port 16, and the outer doors 30, 31 are then fully closed.

It is to be understood that the 45° throat plane 41 is exemplary only, and is not intended to limit the scope of the claims. As those skilled in the art will readily appreciate, the angle of the throat plane 41 can be varied by merely varying the slopes of the forward surface 23 and the flow directing surface 39.

Although this invention has been shown and described with respect to detailed embodiments thereof, it will be understood by those skilled in the art that various changes in form and detail thereof may be made without departing from the spirit and scope of the claimed invention.

I claim:

1. A flow diverting nozzle for directing exhaust gas diverted from a duct of an axial flow gas turbine engine through a port in the duct, said nozzle comprising:

an outer member radially outward of the duct and including a flow passage extending radially outward from the port, the passage having a first end adjacent the port and a second end radially outward from the first end, a first surface extending between the first and second ends, the first surface curved radially aftward to deflect fluid flowing along the first surface aftward, a second surface opposite the first surface, the second surface sloped radially forward to deflect fluid flowing along the second surface forward, and a tubular sleeve radially outward of the duct and coaxial therewith having a flow directing flange extending radially aftward from one end of the sleeve into the passage, the sleeve selectively positionable between a first sleeve position with the end of the sleeve sealingly contacting the first surface to prevent exhaust gas from flowing into the passage through the duct port and a second sleeve position which provides a maximum entry flow area for exhaust gas flowing into the passage from the duct port; and, at least two doors radially outward of the flow passage, the doors selectively positionable between a first door position with one of the doors in sealing contact with another of the doors to prevent exhaust gas from flowing out of the passage and a second door position which provides a maximum exit flow area for exhaust gas flowing from the passage.

2. The nozzle of claim 1 wherein the outer member further includes a channel adjacent and radially inward of the second surface, the channel contoured to receive the flow directing flange when the sleeve is in the second sleeve position.

3. The nozzle of claim 2 wherein the flow directing flange extends from the sleeve at an angle of approximately 45°.

4. The nozzle of claim 1 further including sleeve actuator means attached to the sleeve for selectively positioning the sleeve, and door actuator means attached to the doors for selectively positioning the doors.

5. The nozzle of claim 4 wherein the outer member further includes a channel adjacent and radially inward of the second surface, the channel contoured to receive the flow directing flange when the sleeve is in the second sleeve position.

6. The nozzle of claim 5 wherein the flow directing flange extends from the sleeve at an angle of approximately 45°.

* * * * *

UNITED STATES PATENT AND TRADEMARK OFFICE
CERTIFICATE OF CORRECTION

PATENT NO. : 5,098,022

DATED : March 24, 1992

INVENTOR(S) : Edward B. Thayer

It is certified that error appears in the above-identified patent and that said Letters Patent is hereby corrected as shown below:

Title page, item [75],
"Inventor: Edward B. Thayer, Palm Beach Gardens" should read --Inventor: Edward B. Thayer, Palm Beach Gardens, Florida--.

Column 2, line 29, delete "is".
Column 2, line 41, change "!7" to --17--.
Column 3, line 11, change "!4" to --14--.

Signed and Sealed this

Thirteenth Day of July, 1993

Attest:

MICHAEL K. KIRK

Attesting Officer

Acting Commissioner of Patents and Trademarks